(No Model.)

J. F. FOWLER.
TWINE BINDER.

No. 503,844. Patented Aug. 22, 1893.

WITNESSES:
F. L. Durand
Jo. L. Coombs

INVENTOR:
Joinville F. Fowler
by Louis Bagger & Co.
Attorneys

UNITED STATES PATENT OFFICE.

JOINVILLE F. FOWLER, OF ALLIANCE, OHIO.

TWINE-BINDER.

SPECIFICATION forming part of Letters Patent No. 503,844, dated August 22, 1893.

Application filed January 23, 1893. Serial No. 459,332. (No model.)

*To all whom it may concern:*

Be it known that I, JOINVILLE F. FOWLER, a citizen of the United States, and a resident of Alliance, in the county of Stark and State of Ohio, have invented certain new and useful Improvements in Twine-Binders; and I do hereby declare that the following is a full, clear, and exact description of the invention, which will enable others skilled in the art to which it appertains to make and use the same; reference being had to the accompanying drawings, which form a part of this specification.

My invention relates to improvements in twine binders for reaping machines, and consists in the novel construction and combination of parts, hereinafter fully described and claimed.

In the accompanying drawings:
Figure 1 is a perspective view of a grain-binder constructed in accordance with my invention.
Fig. 10 is a detail sectional view of the knotter-bill.
Fig. 11 is an elevation of the cord-holder.
Fig. 12 is a perspective view of the knife and the pivoted arm by which it is operated.
Figs. 13 and 13$^a$ are detail views showing face views of the wheel or disk for actuating the knotter-bill and cord-holder.
Fig. 14 is a detail horizontal sectional view of the means for actuating the cord-holder.

In the said drawings the reference numeral 1 designates the reaper frame upon which the binder frame comprising a series of longitudinal beams 2, and transverse bars 3, is supported. At its delivery side the binder frame is provided with two downwardly depending plates 4, having holes or apertures through which passes a transverse rod 5, secured to the reaper frame. At its opposite end the reaper frame is provided with an outwardly extending dovetailed plate 6, having an upwardly extending lug 7, provided with a screw-threaded aperture through which passes a screw-threaded rod which also passes through one of the horizontal beams of the binder frame and is provided with a nut 8 and washer 9. By rotating this screw-rod the binder frame can be moved laterally upon the reaper frame so as to center the knotting mechanism with respect to the grain delivered thereto from the reaper. Upon the opposite end of the reaper frame is a dovetailed plate 10, with which engages a downwardly depending grooved plate 12, on the binder frame by which the latter is guided in its lateral movement. A similar plate 12$^a$ at the opposite end engages with plate 6.

The numeral 13 denotes the main driving shaft journaled in one of the horizontal beams 3 and the intermediate horizontal beam of the binder frame, and is provided at one end with a pulley 14, by which it may be connected to some moving part of the reaper. At its opposite end this shaft is provided with two sprocket wheels 15, firmly secured thereto, which are connected with sprocket wheels 16, by endless chains 17, provided with packing fingers 18. The sprocket wheels 16 are pivoted to the inner ends of arms 19, journaled at their outer ends on a short transverse bar or rod 20, secured to the intermediate horizontal bar of the binder frame. Intermediate of their ends these arms 19 are provided with upwardly extending brackets in which are journaled sprocket wheels 21, over which the chains 17 travel. Also pivoted to said arms are two short curved arms 23 which are journaled at their upper ends on a rod 24, which passes through an aperture in the extension 25$^a$ of the hub 25 of the needle arm 26. This needle arm consists of a curved metal bar provided with flanges 27 at its free end connected together by a series of bars or studs 28, thus forming a guide-way for the twine or cord, and having a hole or eye for the passage of the twine or cord to the cord holder. The needle arm is actuated by a transverse shaft 29, journaled in bearings on one of the end and the intermediate horizontal beam of the binder frame and at one end is provided with an interrupted or mutilated gear-wheel or pinion 30, with which engages a series of cogs 31 on the lower end of a lever 32, pivoted to an upright 33, secured to the one of the beams of the binder frame at or near the center thereof, and provided with upper and lower arms 34 and 35, preferably formed integral with said upright, forming a three-sided supporting frame.

The upper end of lever 32 is provided with an outwardly extending stud 36, which engages with a cam groove 37 on the inner face of a master wheel 38, pivoted to the said upright, so that as said wheel is actuated, as hereinafter described, the lever 32 will be vibrated and the needle arm operated.

Near one end the main shaft is provided with a sleeve 41, provided with a disk 42, having a spline 43. Encircling sleeve 41, is a hub 44, having a recess 45, with which the spline 43 is adapted to engage. This hub carries a cog-wheel 46, which meshes with a series of cogs 47 on the master wheel 38.

The numeral 48 designates a curved trip lever, the inner end of which is bifurcated and pivoted or journaled to the needle arm shaft, and curved at said point so as to form shoulders 25$^b$ against which the extension 25$^a$ of the hub 25 strikes when the needle arm is thrown back after the gavel has been bound and discharged. Intermediate of its ends upon the lower side, the trip lever is provided with a loop 49, with which engages a stud 50, on an arm 51, secured to a transverse rock shaft 52, provided at its opposite end with an arm 53, which engages with an inclined slot 54 in lever 55, pivoted to lugs 56 on a bracket 57 secured to the upright 33. The lever 55 is provided with two downwardly depending curved arms 58, having their free ends bent inwardly and engaging with the face of disk 42. The lower end of said lever is cut away on one side forming a shoulder 59, which strikes against the other face of disk 42, when the lever is actuated and forces said disk outward so that its spline will engage with the notch or recess 45 in the hub 44, whereby the wheel 46, will rotate with the main shaft and actuate the master wheel. The arm 53 which actuates lever 55, is provided with an upwardly extending lug 60, which strikes against the lower end of a depending spring 61, secured to the bracket 57 which serves to return said lever to normal position.

The rock shaft 52 at its front end is provided with an arm 52$^a$, which, when the trip lever is actuated to throw the disk 42 out of mesh with wheel 46, engages with a recess 52$^b$ in the periphery of the master-wheel, and holds the master wheel stationary.

Secured to one end of the main shaft is a bevel gear 62 which meshes with a bevel pinion 63, carried by a shaft 64 journaled in brackets 65 connected to the cross beams of the binder frame and to the main shaft. Upon its opposite end the shaft 64 is provided with a crank 66, to which is pivoted a pitman 67, pivoted to a lug 68 secured to the inclined or diagonal butting board 69. This board has upwardly extending arms 70 near each end journaled on a rod or bar 71, carried by an upright 72 secured to one of the bars of the reaper frame.

Journaled in lugs 73 formed on the upper arm 34 of the three-sided supporting frame is an intermittently rotatable horizontal shaft 74, provided at one end with an interrupted or mutilated pinion 75 meshing with the cogs of the master-wheel. At the point of interruption or where the cogs are cut away, the said pinion is provided on one face with a stud or tooth 76, with which engages a lug 76$^a$ on the face of the master-wheel. At said point the pinion 75 is also provided with a segment 76$^b$ adapted to engage with the periphery of the master-wheel and prevent any accidental movement of the pinion when the mutilated portion thereof registers or coincides with the cogs of said master wheel. It will be noted that the diameter of the master-wheel is somewhat greater than that of the circle on which the cogs 47 are described, and just at one side of the lug 76$^a$ is a curved notch or recess 77 in the periphery of the master-wheel, with which the segment 76$^b$ engages during the rotation of the said master-wheel and pinion. At a distance from said recess 77, equal to the circumference of said pinion is a similar recess 77$^a$, with which said segment also engages. The object of this construction and arrangement is to cause a single revolution of the shaft and knotter at the proper moment, for knotting the cord or twine as hereinafter described.

At its opposite end the shaft 74, is provided with a pinion 78 which meshes with a similar pinion 79 on the end of a short shaft 80, journaled in a box 81, secured to the arm 34. At one end this shaft carries a cam wheel or disk 82, provided on one end face with a cam groove 83, and a series of cogs or rack-teeth 84, by which the knotting bill is actuated. This knotting bill consists of a hollow shaft or rod 85 having its lower end bent into a hook or jaw 86, provided on its upper side with a groove 87, and near its upper end is cut away and journaled in the bearings 88, in a bracket 89, connected with the box 81, and extending around and in rear of the cam disk. Intermediate of its ends the knotting bill is provided with a pinion 90, with which the cogs 84 engage when the cam-disk is rotated and the said knotter or bill caused to make a revolution at the proper time to knot the cord. Located in the groove 87, of the hook or jaw 86, is a finger 91, pivoted to the knotting bill, and connected with a vertical rod 92, extending through and above the hollow shaft 85. This finger is provided on its under side with a point 91$^a$. The upper end of this rod is connected with a lever 93, pivoted to the bracket 89, said lever having its free end formed or provided with a short upwardly projecting arm 94, having a stud 96, which engages with the cam-groove 83, of the disk 82, whereby said finger 91 is actuated to hold and release the cord or twine.

In line with the lower side of the jaw 86, is a horizontal plate 95, between which and the trip lever 48, the grain is carried by the packer to form a gavel. The inner end of this plate is cut away to allow the needle arm and knotting bill to operate.

Near its outer end the plate 95 is provided with two lugs 95$^a$ in which is journaled a short shaft 97 provided with a sprocket pinion 98, connected by means of a sprocket chain 99, with a sprocket wheel 100 on a sleeve 101, journaled on a shaft 101$^a$ carried by the head or box 81, secured to one end of arm 34. Near its opposite or inner end the sleeve 101 is provided with a face-wheel 102, having a series of outwardly projecting studs 102$^a$ with which engages a stud 103 on one face of the cam-disk 82, during the movement of said disk and causing an intermittent rotary movement to be imparted to the sleeve 101 and shaft 97.

Upon the inner end of shaft 97 are secured two cord-holding disks 104, having their peripheries provided at equal distances apart with curved recesses 104$^a$, forming a series of hooked radial arms 105. These disks are separated a short distance from each other and in the space therebetween projects a curved pawl or finger 106, pivoted to a lug 107 on the plate 95. A flat spring 106$^a$ secured to said plate bears with its free end upon this finger or pawl, so as to hold the cord or twine during the operation of forming the gavel and binding it into a sheaf, as will be hereinafter described.

Just at one side of the cord holding disks is a guide 108, within which reciprocates a horizontally movable block 109, carrying an upwardly projecting knife or cutter 110. One end of this block is pivoted to the lower end of a lever 112, journaled on shaft 101$^a$. This lever is provided with a stud 114 with which engages stud 115 on the inner face of cam-disk 82, whereby said lever is operated to actuate the knife to sever or cut the cord.

Journaled in the bracket 57 and a bracket 57$^a$ secured to the arm 34 is a horizontal rock-shaft 117, with a series of grain holding and sheaf delivering arms 118, and 119 arranged in pairs and the arms of each pair being at right angles to each other. The arms 118 are the holding arms, and arms 119 are the delivery arms. At one end, shaft 117 is provided with a segment gear 120, with which engages a cogged or toothed lever 121, pivoted to a lug 122 on the upright 33. Intermediate of its ends this lever is provided with a stud 123, which engages with a cam groove 124 in one face of the master-wheel, so constructed as to give an oscillating movement to said lever and the rock bar 117.

Journaled to the main shaft are two outwardly extending and horizontally adjustable supporting arms 125 to the outer ends of which is secured a finger bar 126, also connected with a horizontally adjustable operating arm 127, secured to a horizontal shaft 127$^a$ provided with an arm 127$^b$ having a stud 127$^c$ working in a cam groove 127$^d$ in the outer face of the master-wheel. This sickle bar has a series of fingers 128, similar to those of an ordinary reaping machine, and is provided with a reciprocating cutter bar 129, connected at its one end by means of a pitman 130, with a crank disk or wheel 131, secured to the outer end of a shaft 132, journaled in a sleeve 134, secured to the sickle or finger bar. The inner end of this shaft is provided with a bevel pinion 135 meshing with a bevel gear 136, on the main driving shaft.

Connected with the delivery side of the binder frame are curved arms 137, which carry a guard 138, to prevent cutting of the cord or twine by the cutter or sickle.

Figure 1:
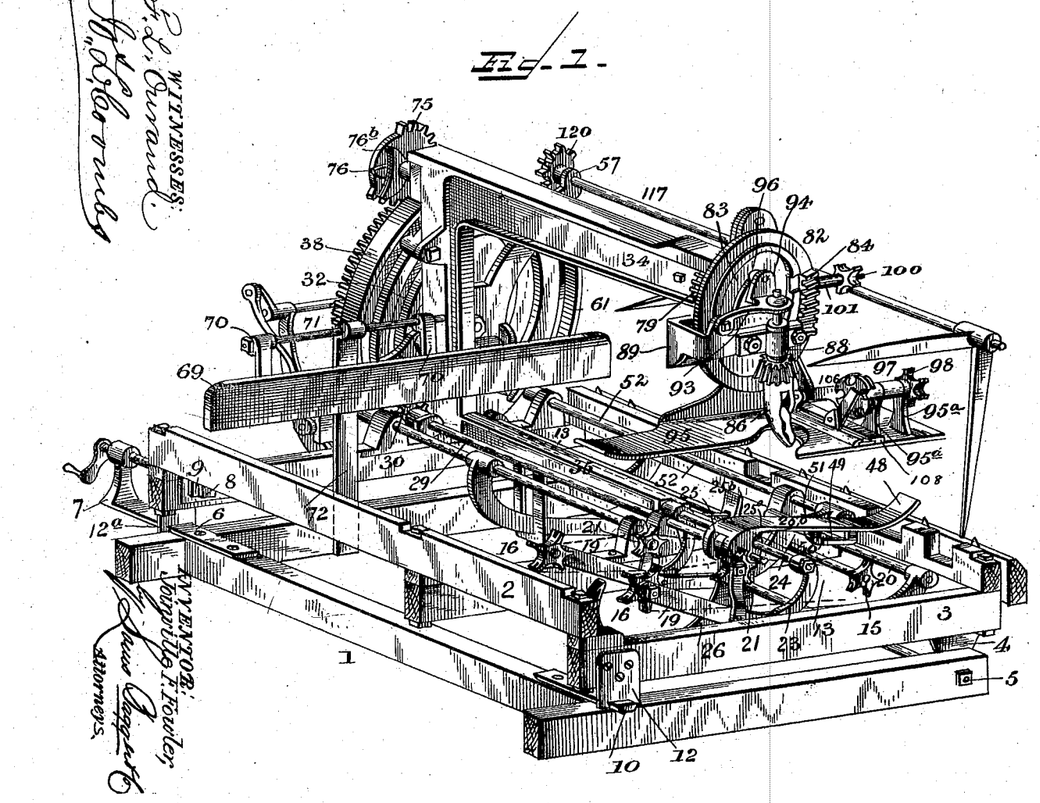
Figure 2:
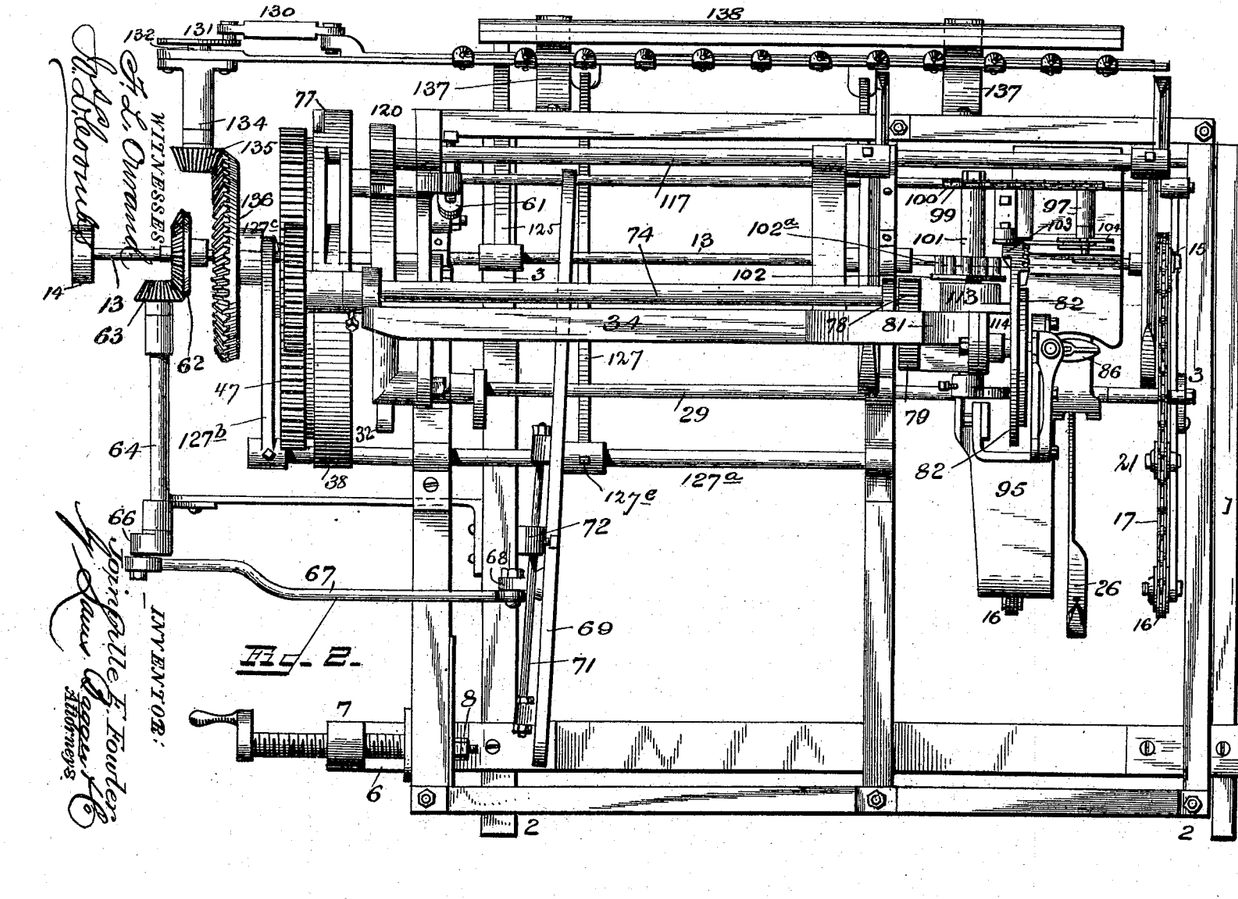
Fig. 2 is a plan view of the same.
Figure 3:
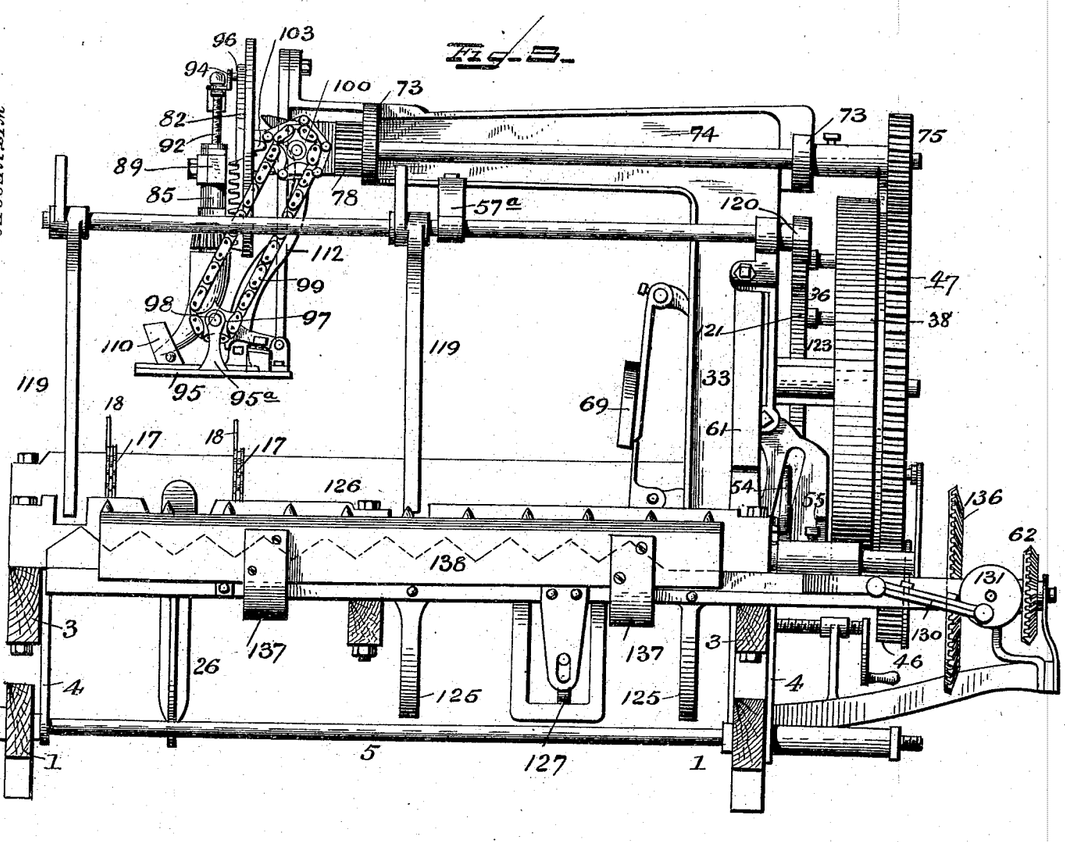
Fig. 3 is an end view.
Figure 4:
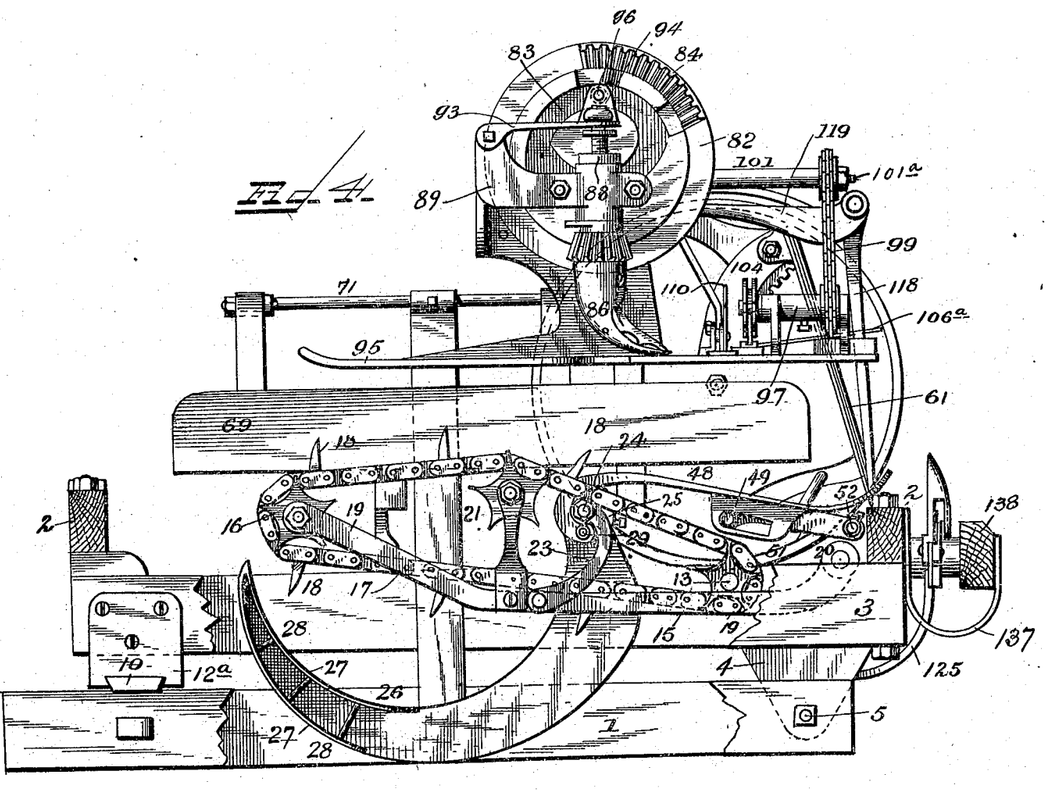
Fig. 4 is a side elevation.
Figure 5:
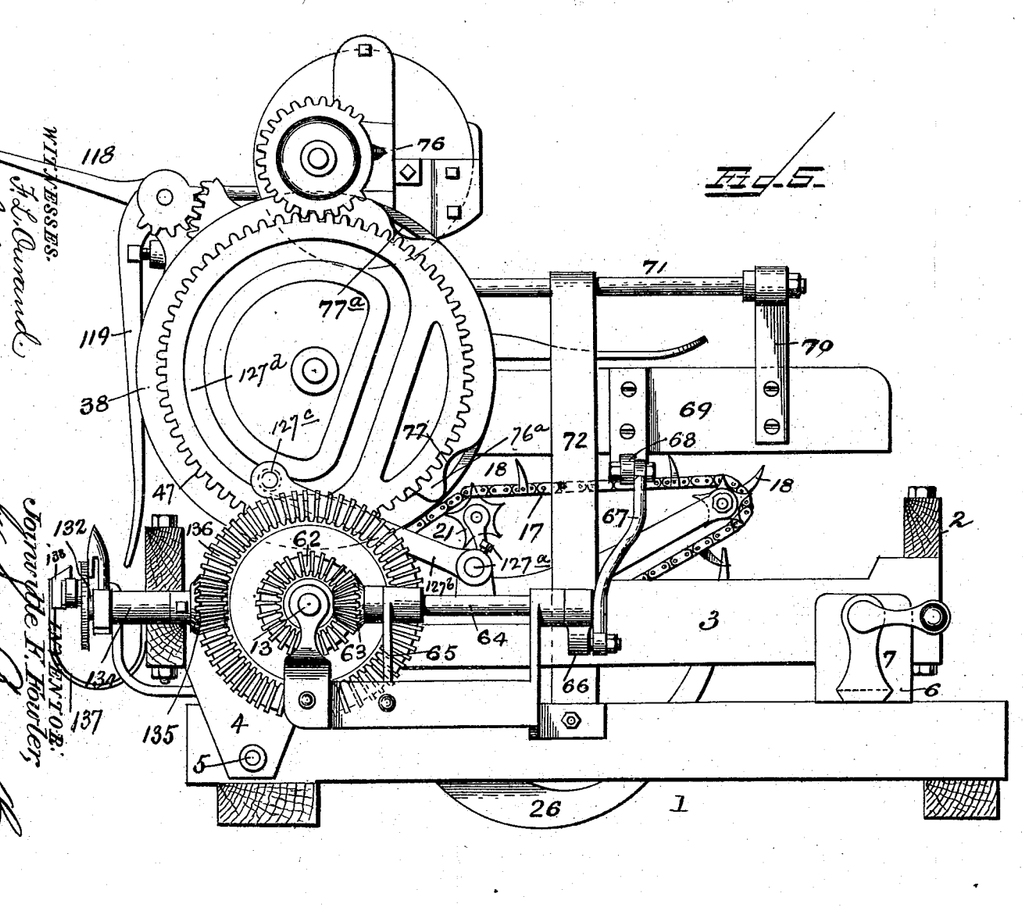
Fig. 5 is a similar view, looking from the opposite side.
Figure 6:
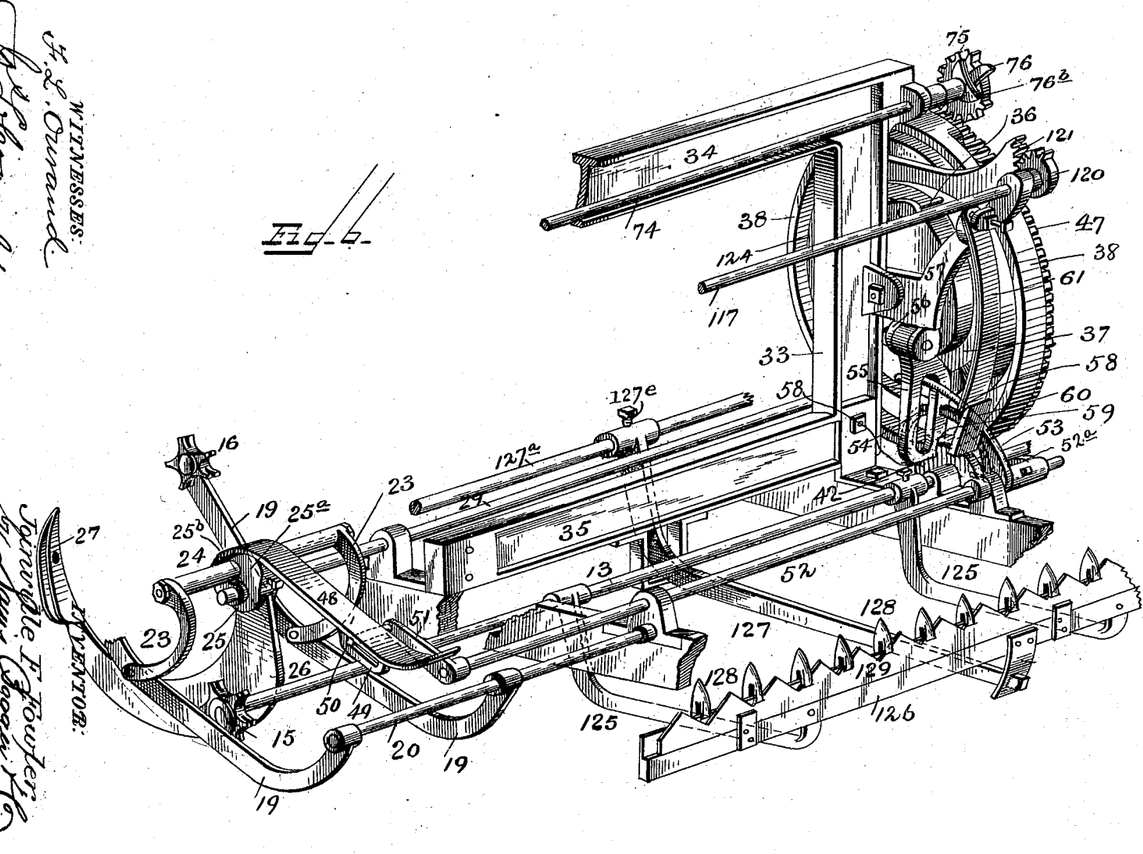
Fig. 6 is a detail perspective view.
Figures 7, 8, 9:
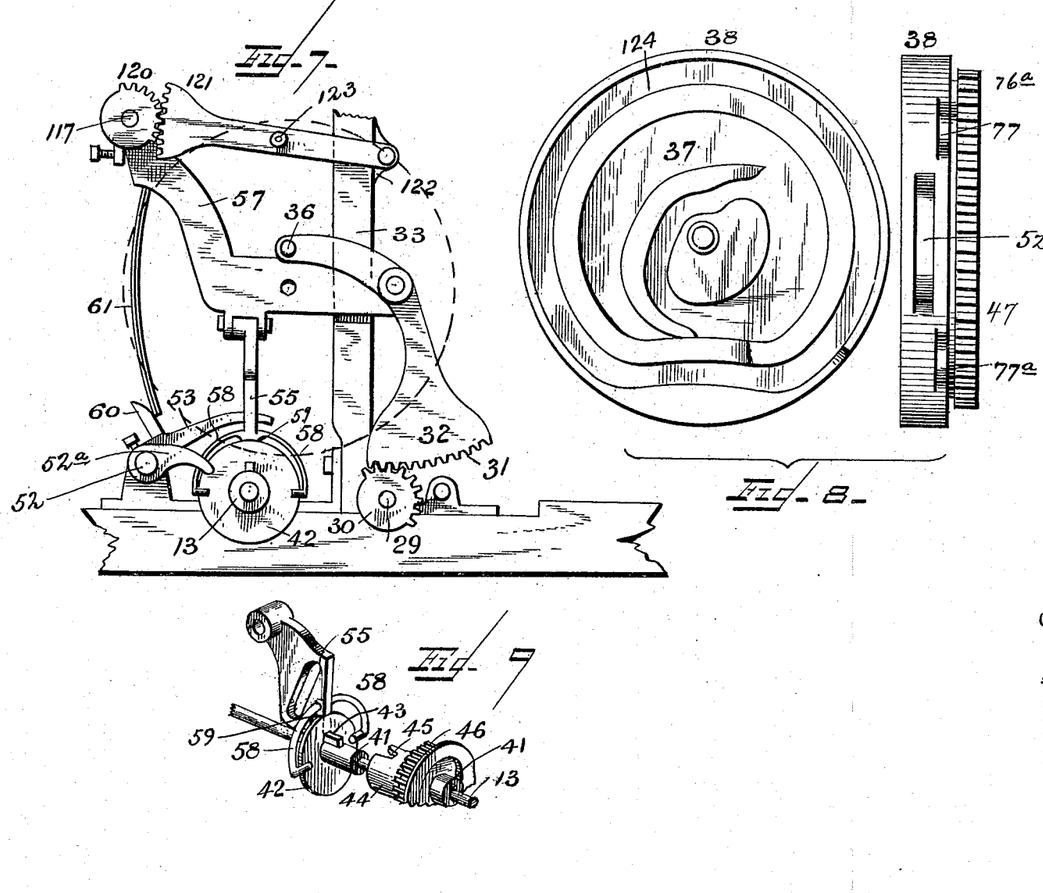
Fig. 7 is a detail elevation.
Fig. 8 is a face and side elevation of the cam-wheel.
Fig. 9 is a detail perspective view of the clutch and its operating devices on the main driving-shaft.
Figures 10, 11, 12, 13, 13A, 14:
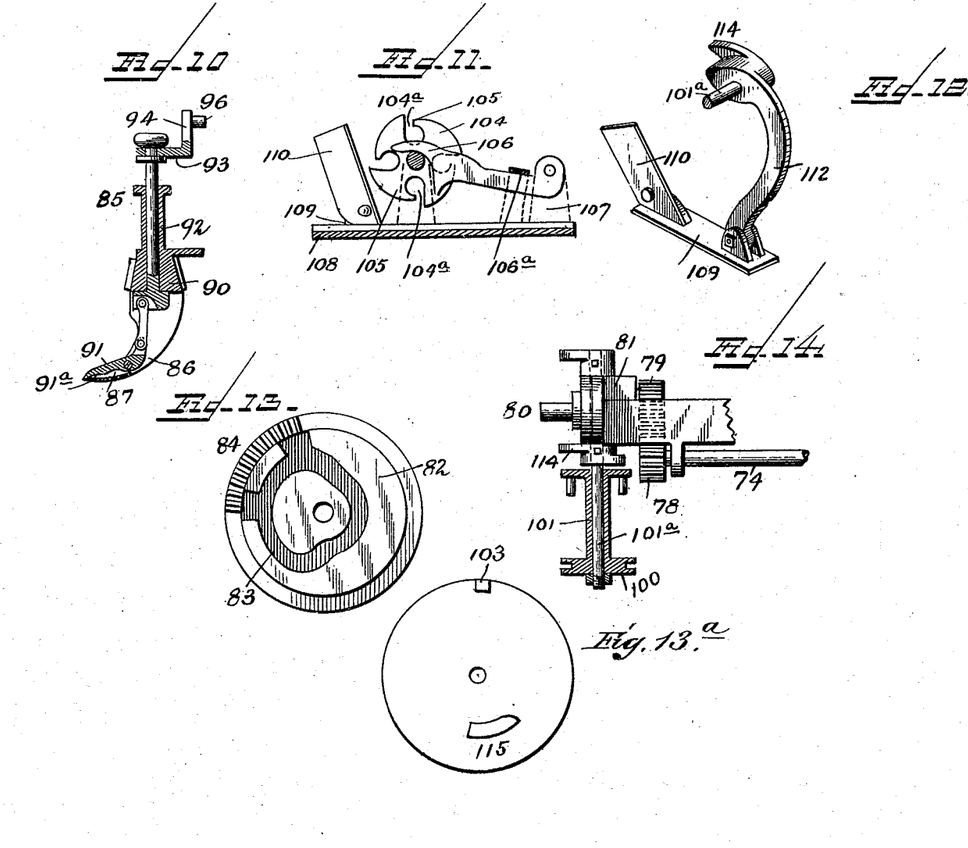

The operation is as follows: The binder frame may be secured or connected with any ordinary reaping machine and when in normal position the needle arm is thrown back into the position shown in Fig. 4, the binding twine passing from the spool to and through the eye in the needle arm, over the curved jaw of the knotting bill and from thence to the cord holder and the frame carrying the packing chains is elevated by means of the hub extension 25$^a$ of the needle arm so that the fingers thereof will engage with the grain delivered from the reaper. At the same time said hub extension will engage with the shoulder of the trip lever, causing the outer end thereof to be elevated and through the medium of the loop 49, and arm 51, the rock shaft 52 will be actuated, so that its arm 53, engaging with the inclined slot in lever 55, will move the latter and by means of the curved arms 58 the disk 42 on sleeve 41 will be thrown out of mesh with cog wheel 46, so that when the main shaft is rotated, said wheel will not rotate therewith. The arm 52$^a$ will also engage with the recess 52$^b$ in the periphery of the master wheel, and lock the same against accidental movement. As the reaper proceeds to work the grain is delivered therefrom to the packers, which being actuated by the main shaft 13, carry the same to the trip lever and from it into a gavel between said lever and the horizontal plate 95 and the holding arms 118, the butting board being also operated by its connections to properly even the grain. When a sufficient quantity of grain has been delivered to the binder to form a gavel, the trip lever will be operated by the weight thereof to depress the arm 51, which will be depressed actuating the rock bar and lever 55, and the latter striking the disk 42 will force it outward so that its spline will engage with the recess or notch 45 in hub 44 thus clutching the same and causing the wheel 46 to be rotated. At the same time the arm 52$^a$ will be thrown out of engagement with the recess 52$^b$ in the master wheel and allow the latter to be rotated by the gear wheel 46. As said master wheel rotates the needle arm shaft 29 will be actuated by means of the mutilated gear-wheel 30 and lever 32, causing said needle arm to be moved up in front of the knotting bill. While this is taking place, the packing frame will be depressed so that the fingers of the packer chains will be thrown out of contact with the grain. During the movement of the needle arm, the twine will be carried around the gavel over the knotting bill, the twine as it comes from the cord holder also passing thereover. Just about the moment the needle arm passes above the jaw of the knotting bill, the lug 76ª will strike the stud 76 of the mutilated pinion 75, causing the same to be thrown into gear with the cogs of the master wheel and the shaft 74 to be rotated. As this shaft rotates it will cause the knotting bill to make a complete revolution, and the twine to be knotted. While the knot is being tied the finger 91, will be opened and then closed by the rod 92, lever 93, and cam-groove 83 in the disk 82, and thus clamp and hold the twine. As the knotter completes its movement the needle arm will pass just beyond the cord holding disks, which will be rotated through the medium of the stud 103 on the cam disk 82, the studs 102ª, shaft 101, sprocket chain 99, and shaft 97. As these disks are thus actuated the radial arms 105 will catch the cord or twine from the needle bar and grasp it between them and the pivoted pawl or finger 106, when the cutter will be operated by the lever 112, lug 114, and stud 115, on the cam disk 82, to sever the twine. The delivery arms will now act to throw the sheaf from the apparatus, the finger bar 126 in the meanwhile being elevated by the arm 127, and through its connections, the sickle or cutter bar is reciprocated.

When the grain to be cut by the reaper stands up vertically in the field and is in good and first-class condition, the sickle is not to be employed, as the cut grain will be fed to the binder in distinct and separate gavels. To throw the sickle out of operative condition it is only necessary to loosen set screw 127ᵉ passing through the hub of arm 127, when the latter and the arms 125, and the sickle can be shifted so as to throw pinion 135 out of mesh with gear 136, on the main driving shaft, when the cutter or sickle bar will not be reciprocated. When, however, the grain in the field has been beaten down by storms or otherwise, after being cut, it is carried to the binder in a tangled and matted condition, so that instead of being fed to the knotting mechanism in separate gavels, it will be carried thereto in a continuous web. The needle arm will pass up through this web and bind the grain, but the sheaf when delivered from the machine will be connected with said web. It is now that the sickle comes into operation and just after the delivery arms 119 have thrown the bound sheaf from the machine, the sickle will be elevated and the cutter bar reciprocated, so as to sever the sheaf from the web of tangled and matted grain. The guard 138 prevents the cutter bar from contacting with and cutting the binding twine.

Having thus described my invention, what I claim is—

1. In a grain-binder the combination with the oscillating needle arm, of the vertically movable pivoted arms, the sprocket wheels carried thereby, and the packer chains passing over said wheels and provided with packer fingers, substantially as described.

2. In a grain binder the combination with the oscillating needle arm having a hub extension, of the rod or bar connected therewith, the pivoted arms carrying sprocket wheels, the links connecting said arms with the said rod or bar, and the sprocket chains having packer fingers, substantially as described.

3. In a grain-binder the combination with the oscillating needle arm having hub extension, the rod or bar connected therewith, the pivoted arms carrying sprocket wheels, the links connecting said arms with the said rod or bar, and the sprocket chains having packer fingers, of the shaft carrying the needle arm, provided with a mutilated pinion, the cogged lever meshing with said pinion, the stud carried by said lever and the master-wheel having a cam-groove with which said stud engages, substantially as described.

4. In a grain-binder the combination with the oscillating needle arm having a hub extension, the rod or bar connected therewith, the pivoted arms carrying sprocket wheels, the links connecting said arms with the said rod or bar and the sprocket chains having packer fingers, of the needle arm shaft, the trip lever journaled thereon, and adapted to be actuated by the movement of the needle arm, substantially as described.

5. In a grain binder, the combination with the oscillating needle arm having a hub extension and its shaft and means for actuating the same, the rod or bar connected with said hub extension, the pivoted arms carrying sprocket wheels, the links connecting said arms with said rod or bar and the sprocket chains having packer fingers, of the trip lever journaled on said shaft, provided with a loop on its under side, the rock shaft having an arm engaging with said loop, an arm at the opposite end of said rock shaft, the lever having an inclined slot, the main shaft and the disk adapted to be thrown into mesh with a pinion on the main shaft by the movement of said lever, substantially as described.

6. In a grain binder the combination with the oscillating needle arm having a hub extension and its shaft and means for actuating the same, the rod or bar connected with said hub extension, the pivoted arms carrying sprocket-wheels, the links connecting said arms with said rod or bar, and the sprocket chains having packer fingers, of the trip lever journaled on said shaft adapted to be actuated by said hub extension, the loop on the under side of said trip lever, the rock shaft having an arm at its opposite end, the pivoted lever having an inclined slot with which said arm engages, the main shaft the sleeve on said shaft, the disk carried by said sleeve having a spline, the notched hub embracing said sleeve and the pinion carried by said hub, substantially as described.

7. In a grain binder the combination with the trip lever, journaled to the needle arm shaft having bifurcated and curved inner end, the needle arm shaft, the needle arm having a hub extension adapted to engage with and trip said lever when said shaft is actuated, the rock shaft connected with the trip lever, the arm secured to one end thereof, the pivoted lever having an inclined slot with which said arm engages, the cogged master wheel having a peripheral recess, and the arm on the rock shaft engaging with said recess, of the main shaft, the sleeve mounted thereon having a spline, and a disk operated by said lever the notched hub encircling said sleeve, and the pinion carried by said hub engaging with the master wheel, substantially as described.

8. In a grain binder the combination with the needle arm, the intermittently rotating knotter shaft, having a pinion at its rear end, the short shaft having a pinion meshing with the pinion on said shaft, the cam disk having a cam groove and a series of cogs on its rear face, and a stud on its front face, the knotting bill having a pinion engaging with said cogs, the pivoted finger and vertical rod connected with a pivoted lever having a stud working in said groove, the sleeve having a face wheel, with which said stud on the front face of the disk engages, the sprocket wheel and chains, and the cord holding disks, substantially as described.

9. In a grain binder, the combination with the oscillating needle arm, the intermittently rotating knotter shaft having a pinion at one end meshing with a pinion on a shaft carrying a knotter disk, said disk being provided with studs on its front face, of the shaft secured to the supporting frame, the sleeve mounted thereon having a face wheel adapted to engage with one of the studs on said disk, a knife carrying lever fulcrumed on said shaft having a stud adapted to engage with the other stud on the disk, the sprocket wheel on the end of said sleeve, the sprocket chain and the cord holder shaft having a sprocket with which said chain engages, substantially as described.

10. In a grain binder the combination with the binder frame, the three sided supporting frame secured thereto, the oscillating needle arm, the trip lever and connections, the master wheel having a series of cogs or teeth, the knotter shaft provided at one end with a mutilated gear and at the other end with a pinion, the shaft having a gear meshing with said pinion, the disk carried by said shaft, having studs upon one face, and a cam groove and cogs upon the other face, the knotting bill having a pinion intermediate of its ends, the pivoted finger having a vertical rod connected therewith, the lever connected with said rod, having a stud engaging with the groove in the disk, the sleeve connected with the cord holder having a face wheel, the shaft having a lever secured thereto carrying the knife, and the stud on said lever, substantially as described.

11. In a grain binder the combination with the binding mechanism, of a vertically movable and horizontally reciprocating cutter-bar located at the delivery end of the binder, substantially as and for the purpose specified.

12. In a grain binder the combination with the main driving-shaft, the arms 125, journaled thereon, the shaft 127$^a$, the arm 128 secured thereto, of the finger-bar connected with said arms, the cutter bar, and means substantially as described for reciprocating said cutter bar for the purpose specified.

13. In a grain binder the combination with the shaft, the arm adjustably secured thereto, the main shaft, the supporting arms journaled on the main shaft, the finger bar to which said arms are secured, the cutter bar, the pitman, the crank, the shaft having a bevel gear, and the bevel gear-wheel carried by the main shaft and meshing with said gear, substantially as described.

In testimony that I claim the foregoing as my own I have hereunto affixed my signature in presence of two witnesses.

JOINVILLE F. FOWLER.

Witnesses:
  DAVID A. GEIGER,
  H. CLAY ELLIS.